(No Model.)
T. B. JEFFERY.
VELOCIPEDE.
No. 448,655. Patented Mar. 24, 1891.
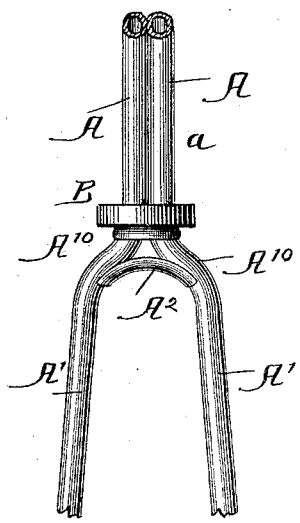
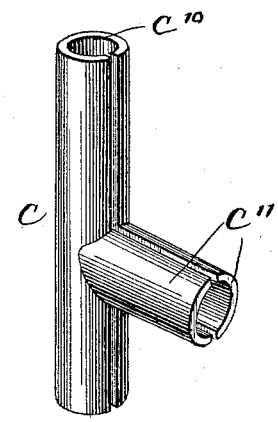
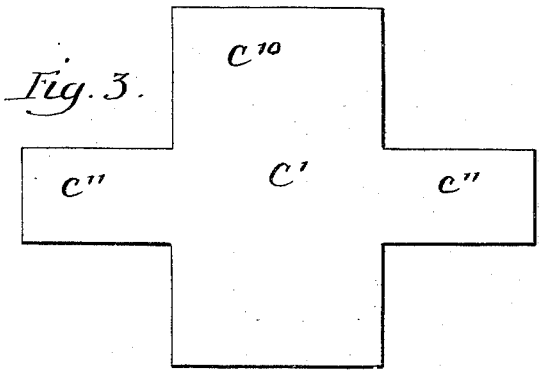
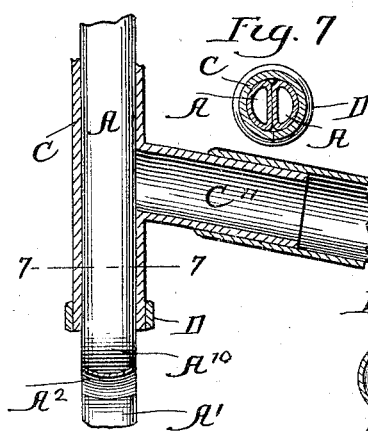
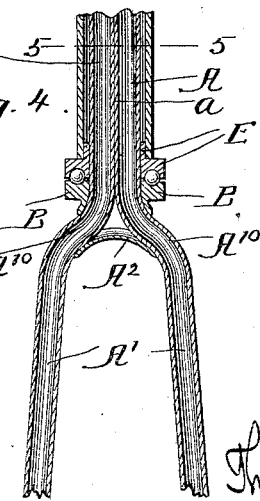

UNITED STATES PATENT OFFICE.

THOMAS B. JEFFERY, OF CHICAGO, ILLINOIS.

VELOCIPEDE.

SPECIFICATION forming part of Letters Patent No. 448,655, dated March 24, 1891.

Application filed May 14, 1890. Serial No. 351,730. (No model.)

*To all whom it may concern:*

Be it known that I, THOMAS B. JEFFERY, a citizen of the United States, residing at Chicago, county of Cook, and State of Illinois, have invented certain new and useful Improvements in a Velocipede-Fork and Frame-Joint, which are fully set forth in the following specification, reference being had to the accompanying drawings, forming a part thereof.

The purpose of this invention is to provide a fork or branched portion of a frame of a velocipede which can be made more cheaply and lighter than such parts of velocipede-frames are now constructed, and also to provide a joint that is a rigid or pivotal connection between two parts of a velocipede-frame, of which the two members may be made more economically and lighter than heretofore. Both these features of invention are illustrated as applied at the joint between the steering-fork and the head of a velocipede; but their application is not limited to this situation in the machine.

Figure 1 is a detail front elevation of a portion of a fork of a velocipede constructed according to my invention, the same being broken away at both ends, showing only so much as is necessary to illustrate the essential feature. Fig. 2 is a perspective of the outer member of a joint for a velocipede-frame, the particular piece selected for representation being that which might constitute a head or bearing for the steering-fork of a velocipede. Fig. 3 is a blank from which the member shown in Fig. 2 may be formed by folding and stamping with dies or by forging. Fig. 4 is an axial section through the entire joint formed of the two pieces shown in Figs. 1 and 2, respectively. Fig. 5 is a section at the line 5 5 on Fig. 4. Fig. 6 is a section through a joint somewhat modified from the construction shown in Fig. 4, section being made at line 6 6 on Figs. 1 and 7. Fig. 7 is a section at the line 7 7 on Fig. 6.

A A represent two pieces of metal tubing which are employed in my invention to form the fork shown in Fig. 1. For this purpose they are preferably, though not necessarily, flattened, the most desirable form being approximately half-round, as seen in Fig. 5, since this form gives more extended flat surfaces, whereat the two pieces may be brought into superficial contact throughout a portion of their length, as hereinafter explained. Whether thus flattened or not, these two pieces are made to coincide through a portion of their length $a$, as seen in Figs. 1 and 4, and are rigidly joined throughout that distance by brazing or other secure method. At the limit of the joined portion the parts A are offset away from the plane of said junction by bending, as shown in the drawings, thereby adapting them to constitute the two arms of the fork. In order to render the connection of the two parts more secure than it would be by merely brazing their contacting surfaces throughout their extent $a$, I prefer to employ the cross-connection piece or brace $A^2$, placed between the separate arms $A'A'$ and brazed onto the proximate surfaces of the diverging portions $A^{10} A^{10}$, which connect the arms $A' A'$ with the contacting portion which constitutes the stem of the fork. As a further means of rendering the junction reliable, I prefer to employ the band B, which is simply a ring encircling the two parts A A at the base of their joined portions—that is, next to the diverging portions $A^{10}$ and preferably brazed onto the exterior surfaces of the two pieces. When this device is employed for a pivotal junction, the band B constitutes a convenient stop for the outer member of the joint, and when the stem A is vertical, so that such stop is at the lower end of the outer member, it may afford convenient means for seating antifriction devices, as balls, making thereat a "ball-bearing," so called. Such construction is illustrated in Fig. 4. I will now describe the other member of the joint when my device is employed in a joint. It consists of the part C, which is made from the sheet-metal blank $C'$ by folding and forging into the form shown in Fig. 2, the member $C^{10}$ being folded cylindrically about a line parallel with its longer dimension, thereby bringing the members $C^{11} C^{11}$ toward each other, said members being then each formed by forging into semicylindrical shape facing each other, that when brought together by the cylindrical folding of the member $C^{10}$ they constitute a substantially cylindrical branch at such angle to the axis of the said cylindrical member as the original flat members $C^{11}$ bore to the member $C^{10}$ in the blank. As illustrated, this is a right angle. This part C when formed as shown in Fig. 2 may be made to receive the stem A A of the fork and to closely encircle it, as seen in Fig. 6, and the facing edges of the part C may then be brazed together, thereby making of said part a hollow T, and when the parts are thus assembled for the purpose of forming a rigid joint the part C may then be brazed onto the stem composed of the parts A. When, however, it is desired to connect the two parts (shown in Figs. 1 and 2, respectively) for the purpose of a pivotal joint, permitting motion about the axis of the part C, said parts will be fitted less closely upon the parts A A. In addition to or instead of brazing the abutting edges of the part C a strengthening band or bands may be employed either outside or inside of the cylindrically-folded member $C^{10}$, or both inside and outside; but when employed inside such band will prevent contact of the member $C^{10}$ throughout its inner surface with the outer surface of the parts A A, and will therefore limit the extent of brazing which can be done to secure such parts together, contact being limited to the surface of the band or ring employed for strengthening, as stated, and therefore when a rigid joint is to be formed if a strengthening-band is needed it is preferably put on the outside. When, however, the parts shown in Figs. 1 and 2 are associated for the purpose of constituting a pivotal joint, permitting motion about the axis of the cylindrical member $C^{10}$ of the part C, the strengthening-band is preferably employed on the inside, and thereby made to serve as the bearing-surface of the outer member of the joint upon the inner member. An outer strengthening-band is illustrated, (shown at D on Figs. 6 and 7,) and an inner strengthening-band is shown at E on Figs. 4 and 5. When the inner strengthening-band E is employed, it may conveniently be extended in a flange E' past the end of the cylindrical member $C^{10}$, and when the situation is such as requires a ball-bearing said flange, matching and co-operating with the band B, fixed outside the fork-stem of the inner member of the joint, serves as the cap of the box for containing the balls of such ball-bearing.

The semi-cylindrical members $C^{11}$ $C^{11}$, when brought facing each other in the completion of the T-fitting, may be strengthened by a band, either exteriorly or interiorly, in the same manner as the cross-member $C^{10}$. I prefer to strengthen this member $C^{11}$ $C^{11}$ by an exterior band, as shown in Fig. 7, and this band may be extended indefinitely and constitute the backbone or other part of the frame of the velocipede in which my joint is employed. It will be observed that the rigidity of the tubular cross-member of the fitting C, independently of the rigidity which may be obtained by brazing together the abutting edges when folded, is largely increased by the presence of the projections $C^{11}$, which may be rigidly joined either by brazing or banding, or which might be joined by bolting, even if no other use were to be made of such member $C^{11}$, which in that case might be made very short. It will also be noticed that the strength gained by thus joining the members $C^{11}$ is very much greater on account of their having been formed concave toward each other than if they were not so shaped, since flat lugs brought together and secured would be readily bent in any strain, which might tend to unfold the cylindrical member $C^{10}$.

I claim—

1. In a velocipede, in combination, substantially as set forth, the pieces of metal tubing A A, joined surface to surface longitudinally for a distance $a$ to form the stem of a fork, and each bent to offset them in opposite directions from the plane of such junction to form the arms of the fork, the band B, encircling the joined portion of said pieces of tubing near the limit of such junction and before they commence to diverge, and a bearing-head in which the stem of such fork is journaled, stopped at its lower end by said encircling band, substantially as set forth.

2. In a velocipede, in combination, substantially as set forth, the pieces of metal A A, joined surface to surface longitudinally for a distance $a$ to form the stem of a fork, and each bent to offset them in opposite directions from the plane of such junction to form the arms of the fork, the cross-brace $A^2$ spanning the interval between such arms and rigidly joined to the diverging portions next to the stem, and the band B, encircling the joined portion of said pieces of tubing near the limit of such junction and before they commence to diverge.

3. In a velocipede, in combination with a fork joined surface to surface for a distance to form the stem and having the remainder of their length offset from the plane of such junction to form the arms of the fork, a hollow T-fitting folded up from sheet metal and having its cross member encircling such stem and the other member made of two projections from the cross member formed concave toward each other and brought together and rigidly joined, substantially as set forth.

4. In a velocipede, in combination with a fork which is comprised of pieces of metal tubing joined surface to surface for a distance to form the stem and having the remainder of their length offset from the plane of such junction to form the arms of the fork, a bearing-head for such fork-stem, consisting of a hollow T-fitting folded up from sheet metal and having its cross member encircling such stem and the other member made of two projections from the cross member formed concave toward each other and brought together and rigidly joined, said bearing-head being strengthened by an interior band E at the end, which constitutes the bearing-surface for the stem, substantially as set forth.

5. In a velocipede, in combination with a fork which is comprised of pieces of metal tubing joined surface to surface for a distance to form the stem and having the remainder of their length offset from the plane of such junction to form the arms of the fork, a bearing-head for such fork-stem, consisting of a hollow T-fitting folded up from sheet metal and having its cross member encircling such stem and the other member made of two projections from the cross member formed concave toward each other and brought together and rigidly joined, said bearing-head being strengthened by an interior band E at the end, said band constituting the bearing-surface for the stem, said fork being strengthened by an exterior band at the base of the stem encircling the said joined pieces of tubular metal and constituting a stop for the head against longitudinal movement on the stem, substantially as set forth.

6. In a velocipede, in combination with a fork which is comprised of pieces of metal tubing joined surface to surface for a distance to form the stem and having the remainder of their length offset from the plane of such junction to form the arms of the fork, a bearing-head for such fork-stem, consisting of a hollow T-fitting folded up from sheet metal and having its cross member encircling such stem and the other member made of two projections from the cross member formed concave toward each other and brought together and rigidly joined, said bearing-head being strengthened by an interior band E at the end, which constitutes the bearing-surface for the stem, said interior band having a flange extending past the end of said head, said fork being strengthened by an exterior band at the base of the stem encircling the said joined pieces of tubular metal and constituting a stop for the head against longitudinal movement on the stem, said flange E' abutting upon such stop, and said stop and flange being provided with corresponding grooves for a ball-bearing, substantially as set forth.

7. In a velocipede-frame, a hollow T-fitting or junction-piece folded from a sheet-metal blank, which comprises a member $C^{10}$, having the members $C^{11}$ $C^{11}$ projecting laterally from its opposite edges, the central member $C^{10}$ being folded cylindrically about a line transverse to the direction in which the members $C^{11}$ project, said members $C^{11}$ being folded concavo-convex and brought together with their concave surfaces facing each other by the cylindrical folding of the member $C^{10}$, as described, substantially as set forth.

In testimony whereof I have hereunto set my hand, at Chicago, Illinois, in the presence of two witnessses, this 10th day of May, 1890.

THOS. B. JEFFERY.

Witnesses:
  CHAS. S. BURTON,
  JEAN ELLIOTT.